(12) United States Patent
Panda

(10) Patent No.: US 10,148,849 B2
(45) Date of Patent: Dec. 4, 2018

(54) SYSTEMS AND METHODS FOR PRINTING A DOCUMENT USING A GRAPHICAL CODE IMAGE

(71) Applicant: KYOCERA Document Solutions Inc., Osaka-shi, Osaka (JP)

(72) Inventor: Debashis Panda, Pleasant Hill, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 10 days.

(21) Appl. No.: 15/063,411

(22) Filed: Mar. 7, 2016

(65) Prior Publication Data
US 2017/0257517 A1 Sep. 7, 2017

(51) Int. Cl.
H04N 1/00 (2006.01)
H04N 1/32 (2006.01)
H04W 8/20 (2009.01)
H04N 1/44 (2006.01)
H04M 1/725 (2006.01)

(52) U.S. Cl.
CPC ..... *H04N 1/32133* (2013.01); *H04N 1/00164* (2013.01); *H04N 1/00244* (2013.01); *H04N 1/00251* (2013.01); *H04N 1/00307* (2013.01); *H04N 1/444* (2013.01); *H04N 1/4413* (2013.01); *H04W 8/20* (2013.01); *H04M 1/7253* (2013.01); *H04N 2201/0094* (2013.01); *H04N 2201/3228* (2013.01)

(58) Field of Classification Search
CPC ........... H04N 1/32133; H04N 1/00307; H04N 1/00244; H04N 1/4413; H04N 1/444; H04N 1/00164; H04N 1/00251; H04N 2201/0094; H04N 2201/3228; H04W 8/20; H04M 1/7253
USPC ....................................................... 358/1.15
See application file for complete search history.

(56) References Cited

U.S. PATENT DOCUMENTS

| 8,610,935 | B1 | 12/2013 | McKinley et al. |
| 9,430,723 | B1 | 8/2016 | Panda |
| 2004/0125402 | A1 | 7/2004 | Kanai et al. |
| 2004/0133636 | A1* | 7/2004 | Kinoshita .......... H04N 1/00127 709/203 |
| 2006/0200472 | A1 | 9/2006 | Nguyen |

(Continued)

*Primary Examiner* — Kent Yip
(74) *Attorney, Agent, or Firm* — Sheppard, Mullin, Richter & Hampton LLP

(57) ABSTRACT

A system comprises a server, a mobile device and an image forming apparatus. The server includes a storage manager for managing storage of documents and associated document identifiers, an image forming apparatus interface for receiving a set request identifying a user from the image forming apparatus and for providing associated document identifiers to the image forming apparatus, and a mobile device interface for receiving from the mobile device a document request containing a document identifier and for providing in response a document associated with the document identifier to the mobile device, the document identifier received by the mobile device from the image forming apparatus as a graphical code image. The mobile device includes a camera for capturing a snapshot of the graphical code image from the image forming apparatus, and a server interface for sending the document request to the server and for receiving the document.

23 Claims, 9 Drawing Sheets

(56) References Cited

U.S. PATENT DOCUMENTS

| | | |
|---|---|---|
| 2007/0019232 A1* | 1/2007 | Kano .................. H04N 1/00307 |
| | | 358/1.15 |
| 2007/0273767 A1 | 11/2007 | Kim |
| 2010/0309505 A1* | 12/2010 | Partridge .............. G06F 21/608 |
| | | 358/1.15 |
| 2011/0085196 A1 | 4/2011 | Liu et al. |
| 2011/0125806 A1 | 5/2011 | Park |
| 2012/0147420 A1* | 6/2012 | Nishimi ................ G06F 3/1204 |
| | | 358/1.15 |
| 2013/0083337 A1 | 4/2013 | Tecu et al. |
| 2013/0194623 A1 | 8/2013 | Tecu et al. |
| 2015/0002870 A1 | 1/2015 | Burke, Jr. et al. |
| 2015/0242168 A1* | 8/2015 | Yu ........................ G06F 3/1208 |
| | | 358/1.13 |
| 2016/0274847 A1 | 9/2016 | Suzuki |
| 2016/0344879 A1 | 11/2016 | Panda |

\* cited by examiner

SYSTEMS AND METHODS FOR PRINTING A DOCUMENT USING A GRAPHICAL CODE IMAGE

CROSS-REFERENCE TO RELATED APPLICATIONS

U.S. patent application Ser. No. 15/063,394, filed Mar. 7, 2016 and entitled "Systems and Methods for Printing a Document Using a Graphical Code Image," is hereby incorporated by reference herein.

TECHNICAL FIELD

Embodiments of the present invention relate generally to printing services, and more particularly provide systems and methods for printing documents.

BACKGROUND

Printing electronic documents stored on network servers is a common task, especially in work environments. In current systems, a user typically initiates a print request from a work computer. The print request identifies the electronic document and the connected printer. In response, the work computer generates a printable representation of the electronic document and displays a print preview. The user can modify print configuration settings and view a new print preview of the electronic document. The user can then launch the print job to the printer. The work computer forwards the printable representation of the electronic document through the network to the printer, which prints the printable representation. The user then goes to the printer to obtain the hardcopy of the printable representation.

U.S. patent application Ser. No. 13/363,336, filed Jan. 31, 2012 and entitled "Printing an Electronic Document Using a Printer and a Mobile Device," discloses a method for printing an electronic document using a printer and a mobile device. The printer receives a request to print. The printer generates a unique identifier in response to the request. The mobile device sends a print job associated with the unique identifier and the electronic document to a print server over a network. The printer sends the unique identifier to the print server. The printer receives the print job from the print server in response to sending the unique identifier, and prints a hardcopy of the electronic document based on the print job.

Systems and methods that are capable of more efficiently printing a network document would be helpful.

SUMMARY

In some embodiments, the present invention provides a printing system comprising a server device including a storage manager configured to manage storage of documents and associated document identifiers, a particular set of one or more of the documents and one or more associated document identifiers being associated with a particular user; an image forming apparatus communication interface configured to receive from an image forming apparatus a set request containing identification of the particular user, and configured to provide the particular set of one or more associated document identifiers to the image forming apparatus in response to receiving the set request; and a mobile computing device communication interface configured to receive a document request from a mobile computing device, the document request containing information identifying a selected document identifier of the particular set of one or more associated document identifiers, the mobile computing device receiving a graphical code image identifying the selected document identifier from the image forming apparatus, and configured to provide a selected document associated with the selected document identifier to the image forming apparatus for printing.

In some embodiments, the present invention provides a method comprising managing storage of documents and associated document identifiers, a particular set of one or more of the documents and one or more associated document identifiers being associated with a particular user; receiving from an image forming apparatus a set request containing identification of the particular user; providing the set of one or more associated document identifiers to the image forming apparatus in response to receiving the set request; receiving a document request from a mobile computing device, the document request containing information identifying a selected document identifier of the particular set of one or more associated document identifiers, the mobile computing device obtaining a graphical code image identifying the selected document identifier from the image forming apparatus; and providing a particular document associated with the selected document identifier to the image forming apparatus for printing.

In some embodiments, the present invention provides an image forming apparatus, comprising an authentication process for authenticating a particular user; a server device communication interface configured to provide a set request to a server device, the server device configured to manage storage of documents and associated document identifiers, a particular set of one or more of the documents and one or more associated document identifiers being associated with a particular user, the set request including identification of the particular user, the server device communication interface being further configured to receive the particular set of one or more associated document identifiers from the server device in response to the set request; an operation panel configured to display the particular set of one or more associated document identifiers, configured to enable identification of a selected document identifier associated with a particular document for printing, and configured to provide a graphical code image associated with the selected document identifier in response to the identification of the selected document identifier; and an image forming unit configured to print a particular printable representation of the particular document associated with the selected document identifier.

BRIEF DESCRIPTION OF THE DRAWINGS

The drawings are provided for purposes of illustration only and merely depict typical or example embodiments. These drawings are provided to facilitate the reader's understanding and shall not be considered limiting of the breadth, scope, or applicability various embodiments.

DETAILED DESCRIPTION

Figure 1:
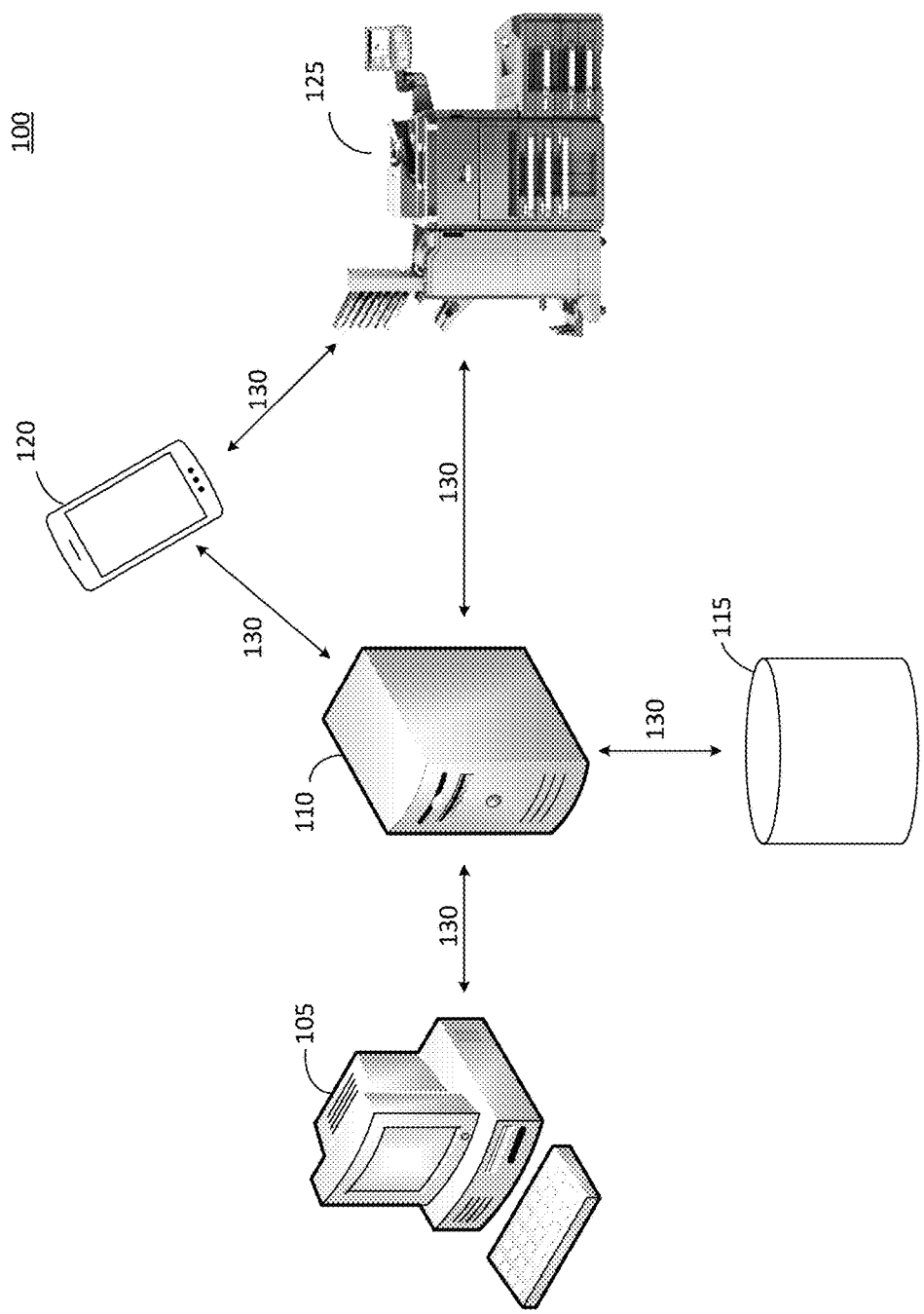
FIG. 1 illustrates a printing system in accordance with some embodiments of the present invention.

The following description is provided to enable a person skilled in the art to make and use various embodiments of the invention. Modifications are possible. The generic principles defined herein may be applied to the disclosed and other embodiments without departing from the spirit and scope of the invention. Thus, the claims are not intended to be limited to the embodiments disclosed, but are to be accorded the widest scope consistent with the principles, features and teachings herein.

In accordance with some embodiments of the present invention, a printing system generates a graphical code image (e.g., dimensional barcodes, dimensional matrix barcodes (such as quick response [QR] codes), alphanumeric characters, and/or any other optical machine-readable representation of data) representing a document identifier (e.g., a document name, a URL, a storage location, a memory location, hash information, an alphanumeric identifier, etc.). The printing system uses graphical code images to transfer document identifiers between mobile devices and image forming apparatuses to identify documents on a server device, e.g., in data storage or a print queue, for printing.

In some embodiments, the user can transfer a particular graphical code image associated with the desired document from one of the mobile computing device or the image forming apparatus to the other. The receiving device can give the graphical code image or the document identifier represented thereby to the server device to enable the server device to locate the desired document. The desired document can be converted into a printable representation. The user can review a print preview of the document on the mobile device, and change configuration settings. The image forming apparatus can print the document.

In some embodiments, the user can provide the graphical code image to the image forming apparatus using a scanner on the image forming apparatus. The image forming apparatus can provide the graphical code image or the document identifier represented thereby to the server device to identify and request the document for printing.

In some embodiments, after a user logs onto the image forming apparatus, the image forming apparatus displays a list of document descriptors of documents that the user is permitted to access (e.g., print jobs located in the queue that are associated with the user) and allows the user to identify a desired document for printing from the list. The document descriptors may be or include the graphical code images. The user uses a mobile computing device to capture a snapshot of the graphical code image associated with the desired document (e.g., using a camera on the mobile computing device). The mobile computing device provides the graphical code image or the document identifier represented thereby to the server device to identify the desired document. The desired document is retrieved from the server device and converted into a printable representation. The server device forwards the document to the mobile computing device. The user can review a print preview of the document, and change configuration settings. After the printable representation of the document is finalized, the document (possibly in a printable representation) is provided to the image forming apparatus for printing.

In some embodiments, the mobile computing device displays a list of document descriptors of documents that the user is permitted to access (e.g., print jobs located in the queue that are associated with the user) and allows the user to identify a desired document for printing from the list. The document descriptors may be or include the graphical code images. In response to selection of the desired document, the mobile computing device displays the graphical code image. The image forming apparatus scans the graphical code image, and provides the graphical code image or the document identifier represented thereby to the server device. The desired document is retrieved from the server device and converted into a printable representation. The server device forwards the document to the image forming apparatus. The user can review a print preview of the document, and change configuration settings. After the printable representation of the document is finalized, the image forming apparatus prints the document.

In some embodiments, the printing system prevents the image forming apparatus from directly accessing documents associated with the user to decrease potential security concerns.

FIG. 1 illustrates a printing system 100 in accordance with some embodiments of the present invention. As shown, the printing system 100 includes a client computing device 105, a server device 110 coupled to data storage 115, a mobile computing device 120, and an image forming apparatus 125.

The client computing device 105, the server device 110, the data storage 115, the mobile computing device 120, and the image forming apparatus 125 may be communicatively coupled together via a network 130. The network 130 may be any type of network through which devices may communicate. In some embodiments, the network 130 is a local area network. In some embodiments, the network 130 is a wide area network such as the Internet. In some embodiments, the network 130 includes a combination of one or more local area networks and one or more wide area networks. The network 130 may be wired and/or wireless.

The client computing device 105 may be any computing device capable of creating and/or editing a document, and in some embodiments creating document identifiers and/or graphical code images representing the document identifiers associated with respective documents. In an enterprise environment, the client computing device 105 may be an employees work computer. The client computing device 105 may include a desktop, laptop, tablet, etc. In some embodiments, the document editing software may be cloud-based. As described in more detail below, the client computing device 105 may instruct the server device 110 to store documents and in some embodiments the graphical code images and/or the document identifiers in the data storage 115. In some embodiments, the client computing device 105 provides a document and the graphical code image associated with the document to a print queue on the server device 110. In some embodiments, the client computing device 105 displays the graphical code image associated with the document the user desires to print, so that the user can use his or her mobile phone to capture a snapshot of the graphical code image and provide the graphical code image to the image forming apparatus 125 where he or she wishes to print his or her document.

The image forming apparatus 125 may be a multi-function peripheral including one or more of functions of a printer and a scanner as well as possibly a facsimile device and/or a copier. The image forming apparatus 125 is configured to exchange graphical code images with the mobile computing device 120. In some embodiments, the exchange of the graphical code images enables documents desired for printing to be identified and printed while the user is near the image forming apparatus. Additional details of the image forming apparatus 125 are provided herein.

The mobile computing device 120 may be, for example, a smart phone, a tablet, a laptop or any other mobile device. The mobile computing device 120 is configured to exchange graphical code images with the image forming apparatus 125. Additional details of the mobile computing device 120 are provided herein.

The server device 110 may be any computing device capable of storing documents and graphical code images and/or document identifiers associated with the documents in data storage 115 or in a print queue. The data storage 115 may be local or external. The server device 110 may query the data storage 115 using the graphical code images and/or document identifiers to locate the associated documents. Based on the embodiments described below, the server device 110 cooperates with the client computing device 105, the mobile computing device 120 and/or the image forming apparatus 125 to provide lists of document descriptors, identify documents desired to be printed, provide documents to the mobile computing device 120 and/or image forming apparatus 125 as needed to enable print previews, and provide documents to the image forming apparatus 125 for printing. Additional details of the server device 110 are provided herein.

Direct to Printer

In some embodiments, the user uses document editing software on the client computing device 105 to generate, edit or access a document. The client computing device 105 generates the graphical code image to associate with the document, provides the document and the graphical code image to the server device 110, and displays the graphical code image. The user uses his or her mobile computing device 120 to capture a snapshot of the graphical code image (e.g., using a camera on the mobile computing device 120). The user uses the mobile computing device 120 to provide the graphical code image to the image forming apparatus 125, e.g., by presenting the graphical code image to a scanner of the image forming apparatus 125. The image forming apparatus 125 provides the graphical code image or the document identifier represented thereby to the server device 110, which uses the graphical code image or the document identifier represented thereby to identify and retrieve the desired document. One of the server device 110, mobile computing device 120 or image forming apparatus 125 converts the document into a printable representation. The user can review a print preview of the document, and change configuration settings. The image forming apparatus 125 prints the document.

Image Forming Apparatus Presents List

In some embodiments, after a user logs onto the image forming apparatus 125, the image forming apparatus 125 obtains document descriptors of documents that the user is permitted to access (e.g., print jobs located in the queue that are associated with the user) from the server device 110, presents the list, and allows the user to identify a desired document for printing from the list. In some embodiments, the user uses his or her mobile computing device 120 to capture a snapshot of the graphical code image associated with the desired document (e.g., using a camera on the mobile computing device 120). The mobile computing device 120 provides the snapshot of the graphical code image or the document identifier represented thereby to the server device 110. The server device 110 uses the snapshot of the graphical code image or the document identifier represented thereby to retrieve the desired document and send the document to the mobile computing device 120, which converts it into a printable representation. The user reviews a print preview of the document, and if necessary changes configuration settings. After the printable representation of the document is finalized, the image forming apparatus 125 prints the document.

Mobile Computing Device Presents List

In some embodiments, the mobile computing device 125 obtains document descriptors associated with documents that the user is permitted to access (e.g., print jobs located in the queue that are associated with the user) from the server device 110, presents the list, and allows the user to identify a desired document for printing from the list. In response to the selection of a desired document, the mobile computing device 120 displays the associated graphical code image. The user provides the graphical code image to a scanner on the image forming apparatus 125. The image forming apparatus 125 captures the graphical code image and provides the graphical code image or the document identifier represented thereby to the server device 110. The server device 110 retrieves the desired document and provides the document to the image forming apparatus 125. The image forming apparatus 125 converts the document into a printable representation. From the mobile computing device 120, the user can review a print preview of the document and can change configuration settings if desired. After the printable representation of the document is finalized, the image forming apparatus 125 prints the document.

In some embodiments, upon receiving a document request containing a graphical code image, the server device 110 uses graphical code recognition techniques to decode the graphical code image into the document identifier. For example, the server device 110 may decode a document identifier from the graphical code image and may compare the document identifier to a stored list of document identifiers to find the corresponding network document.

In some embodiments, upon receiving a document request containing the document identifier (e.g., the mobile computing device 120 or the image forming apparatus 125 already decoded the graphical code image), the server device 110 need not perform the decoding process.

Figure 2:
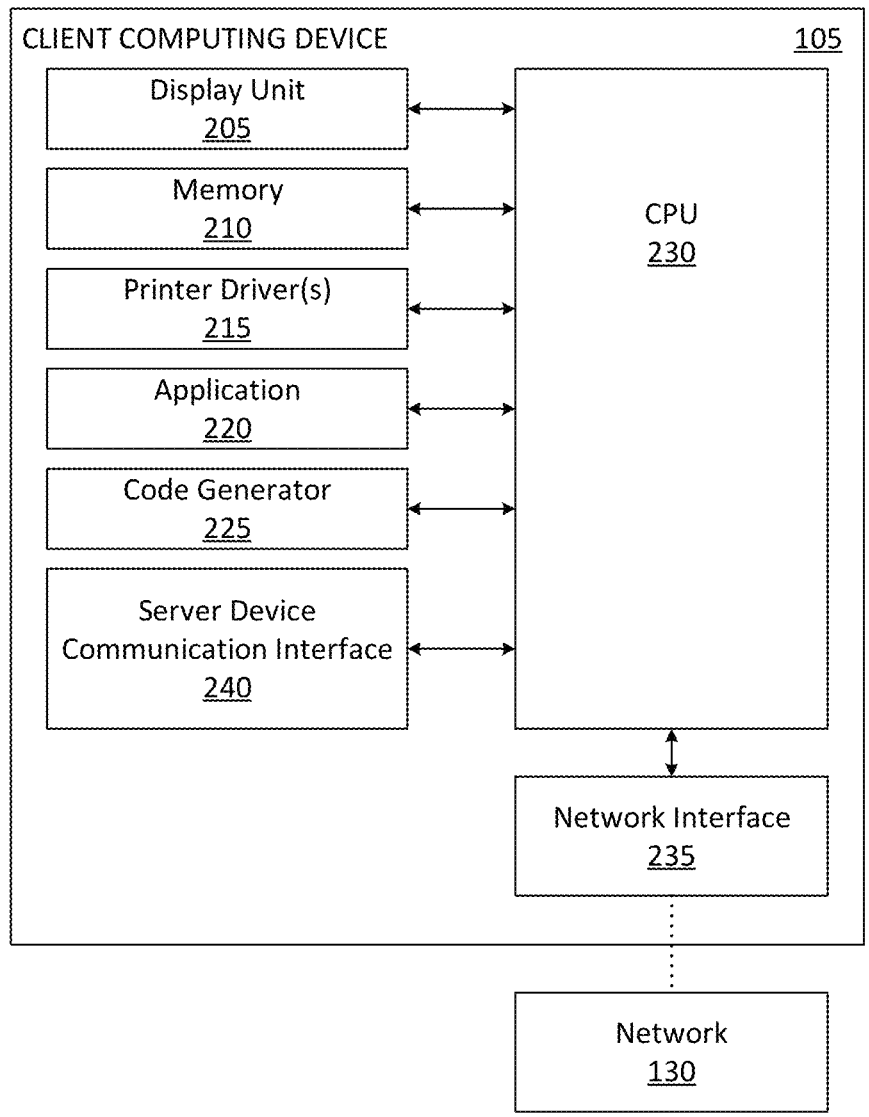
FIG. 2 illustrates a client computing device in accordance with some embodiments of the present invention.

FIG. 2 illustrates a client computing device 105 in accordance with some embodiments of the present invention. The client computing device 105 may include a user interface 205, memory 210, one or more applications 220, a code generator 225, a CPU 230, a network interface 235 capable of communicating with a network 130, and a server device communication interface 240. In some embodiments, the client computing device 105 may include one or more printer drivers 215.

The application 220 (e.g., Microsoft Word) includes document editing hardware, software and/or firmware for a user to generate, edit and/or access a document.

The code generator 225 includes hardware, software and/or firmware to generate a (possibly unique) graphical code image and/or document identifier for the document. In some embodiments, the code generator 225 generates the document identifier, and let's other devices in the printing system 100, e.g., the server device 110, generate the graphical code image.

The server device communication interface 240 includes hardware, software and/or firmware to communicate with the server device 110, e.g., to request the server device 110 to store the document and, in some embodiments, the graphical code image and/or document identifier in the data storage 115. The request to store the document may be a print request, in which the document and the graphical code image and/or document identifier are sent to the server device 110 to be placed in a print queue.

In some embodiments, the code generator 225 includes hardware, software and/or firmware configured to display the graphical code image associated with the document desired to be printed, thus enabling the user to capture a snapshot of the graphical code image using his or her mobile computing device 120.

Figure 3:
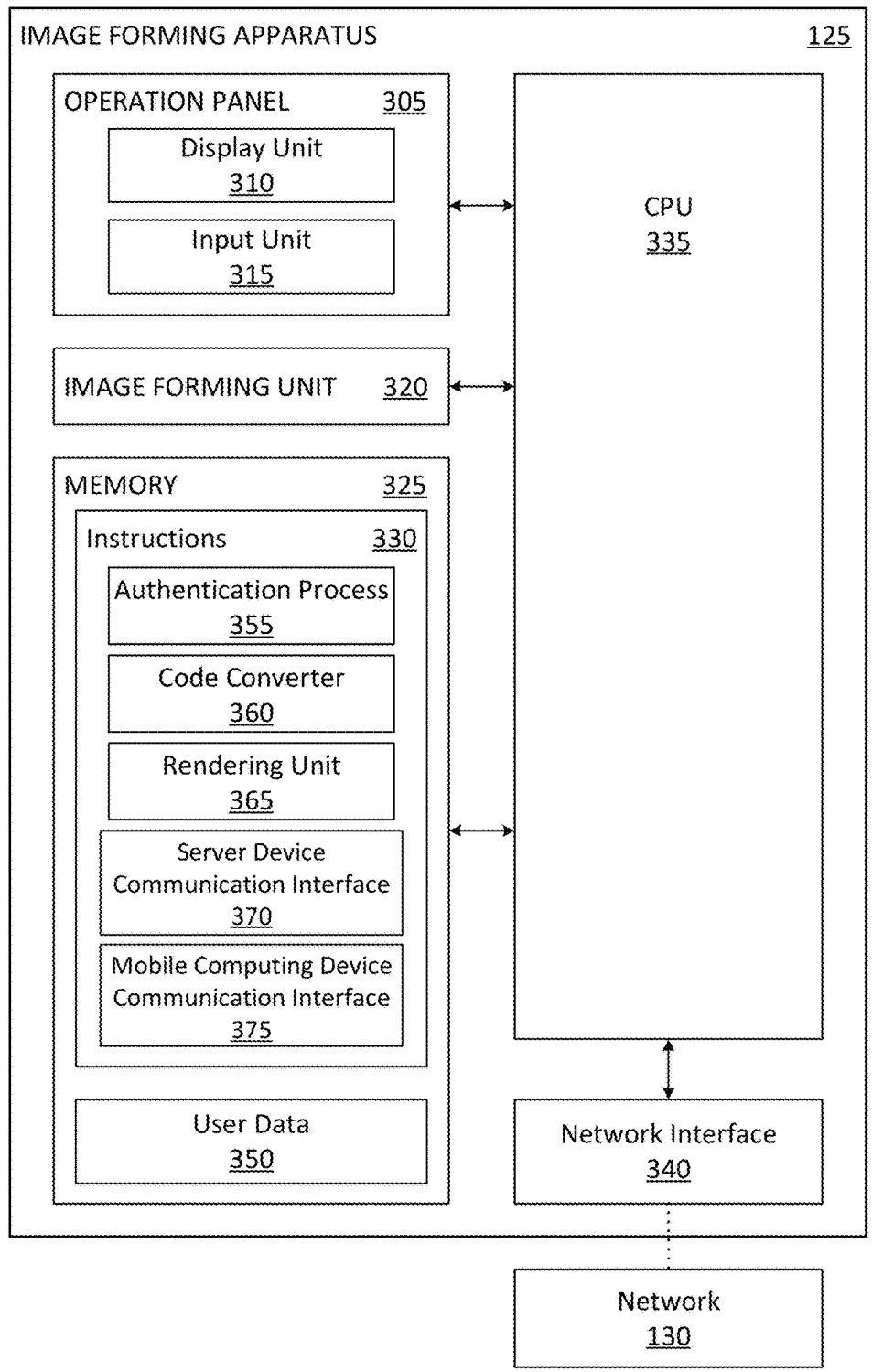
FIG. 3 illustrates an image forming apparatus in accordance with some embodiments of the present invention.

FIG. 3 illustrates an image forming apparatus 125 in accordance with an embodiment of the present invention. The image forming apparatus 125 may include an operation panel 305, an image forming unit 320, memory 325, a CPU 335, and a network interface 340 coupled to network 130. Although not shown, the image forming apparatus 125 may further include a finisher and one or more paper cassettes.

The operation panel 305 may include a display unit 310 and an input unit 315 for facilitating user interaction. The display unit 310 may include an electronic video display, such as a liquid-crystal display (LCD). The input unit 315 may include a combination of devices that allow users to input information into the operation panel, such as buttons, keyboards, switches, dials, image scanners, and/or touch screens. The input unit 315 may include a touch-screen digitizer over the display unit 310 that can sense touch and interact with the display unit 310.

The CPU 335 may include one or more processors capable of executing instructions, such as instructions which cause the image forming apparatus 125 to perform various image forming operations. The CPU 335 may also incorporate special-purpose processors for special purposes built on application-specific integrated circuits (ASICs) and field-programmable gate arrays (FPGAs).

The memory 325 may include both volatile memory and non-volatile memory. Volatile memory may include random-access memory (RAM). Examples of non-volatile memory (e.g., computer readable media) include read-only memory (ROM), flash memory, electrically erasable programmable read only memory (EEPROM), digital tape, a hard disk drive (HDD), and a solid-state drive (SSD). The memory 325 may include any combination of readable and/or writable volatile memories and/or non-volatile memories, along with other possible memory devices. The memory 325 may store instructions, e.g., program instructions, which are executable by the CPU 335 and/or any other processor(s) for running image forming operations of the image forming apparatus 125. The memory 325 may also store data for various programs/applications, as well as data specific to the image forming apparatus 125, e.g., for running the operating system (OS).

The memory 325 may store user data 350 about its users. The instructions 330 may include an authentication process 355 to authenticate a user logging into the image forming apparatus 125. The authentication process 355 may include hardware, software and/or firmware to request the user to enter user identification information and/or a password via the operation panel 305. Like many components herein, the user data 350 may be stored in other locations in the printing system 100.

The instructions 330 may include a rendering unit 365. The rendering unit 365 may include hardware, software and/or firmware for rendering a document into a printable representation.

The instructions 330 may include a server device communication interface 370. The server device communication interface 370 may include hardware, software and/or firmware capable of communicating with the server device 110. In some embodiments, the server device communication interface 370 controls communication via an internal trusted network.

The instructions 330 may include a mobile computing device communication interface 375. The mobile computing device communication interface 375 may include hardware, software and/or firmware capable of communicating with the mobile computing device 120. In some embodiments, the mobile computing device communication interface 375 controls communication via a wireless connection, a Bluetooth connection, a near field communication connection or other connection outside of an internal trusted network.

The image forming apparatus 125 includes an image forming unit 320 capable of printing and scanning and possibly also faxing and copying.

Direct to Printer and Mobile Computing Device Presents List

In some embodiments, the mobile computing device communication interface 375 captures the graphical code image from the mobile computing device 120, e.g., by receiving the graphical code image via the scanner of the image forming unit 320. In some embodiments, the operation panel 305 includes a camera-type device for receiving the graphical code image. The server device communication interface 370 provides the graphical code image or the document identifier represented thereby to the server device 110, which uses the graphical code image or the document identifier represented thereby to identify and retrieve the desired document. In some embodiments, the server device communication interface 370 receives the document from the servicer device 110. The rendering unit 365 converts the document into a printable representation. The image forming unit 320 prints the document.

Image Forming Apparatus Presents List

Figure 5:
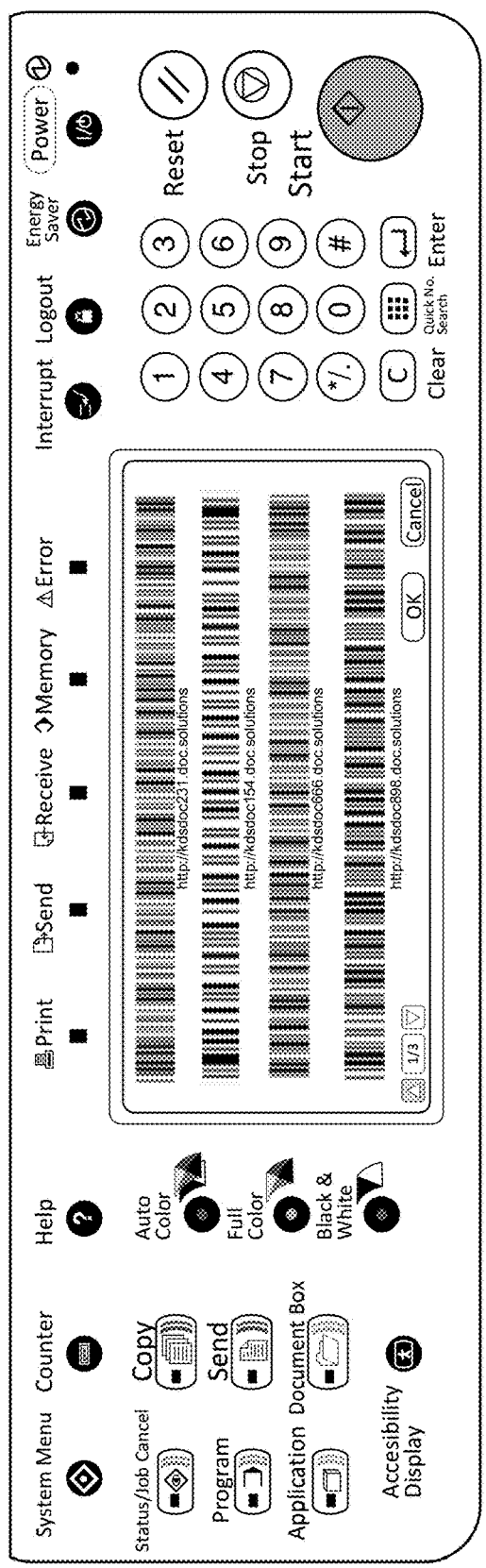
FIG. 5 illustrates a graphical codes list in accordance with some embodiments of the present invention.

In some embodiments, after the image forming apparatus 125 successfully authenticates a user, the image forming apparatus 125 obtains the document descriptors of documents that the user is permitted to access (e.g., print jobs located in the queue that are associated with the user), presents the list, and allows the user to identify a desired document for printing from the list. In some embodiments, the operation panel 305 displays the list of document descriptors, which may be the list of graphical code images as shown in FIG. 5. In some embodiments, to obtain the list, the server device communication interface 370 contacts the server device 110 to request documents that are associated with the user, that can be retrieved from the server device 110, and/or that the user is authorized to access or print. In some embodiments, the image forming apparatus 125 may display a larger version of the graphical code image for the user to capture using his or her mobile computing device 120. After the user reviews a print preview of the document, and if necessary changes configuration settings, the image forming unit 320 prints the document.

In some embodiments, the instructions 330 may include a code converter 360. The code converter 360 may include hardware, software and/or firmware to manage the conversion of graphical code images and document identifiers. For example, upon receiving a graphical code image associated with a desired document from a scanned graphical code image captured from the mobile computing device 120, the code converter 360 may convert the selected graphical code image to the document identifier. The code converter 330 may read, decode, parse, or otherwise interpret the graphical code image to extract the document identifier therefrom. The server device communication interface 370 transmits the document identifier in a document request to the server device 110. As another example, upon receiving a list of document identifiers from the server device 110, the code converter 360 may convert the document identifiers to graphical code images for presentation on the operation panel 305. The document identifier may include a link to an associated network document stored on the server device 110, the name of the network document, printer settings associated with the network document, and other metadata associated with the network document, among other information.

In some embodiments, if the server device 110 uses only document identifiers, the code converter 360 may include a graphical code image coder (when the image forming apparatus 125 receives the list of available documents from the server device 110 with document identifiers and needs to presents the list as graphical code images) and/or code decoder (when the image forming apparatus 125 receives the graphical code image of a selected document from the mobile computing device 120 and needs to request the desired document from the server device 110 with the associated document identifier).

Figure 4:
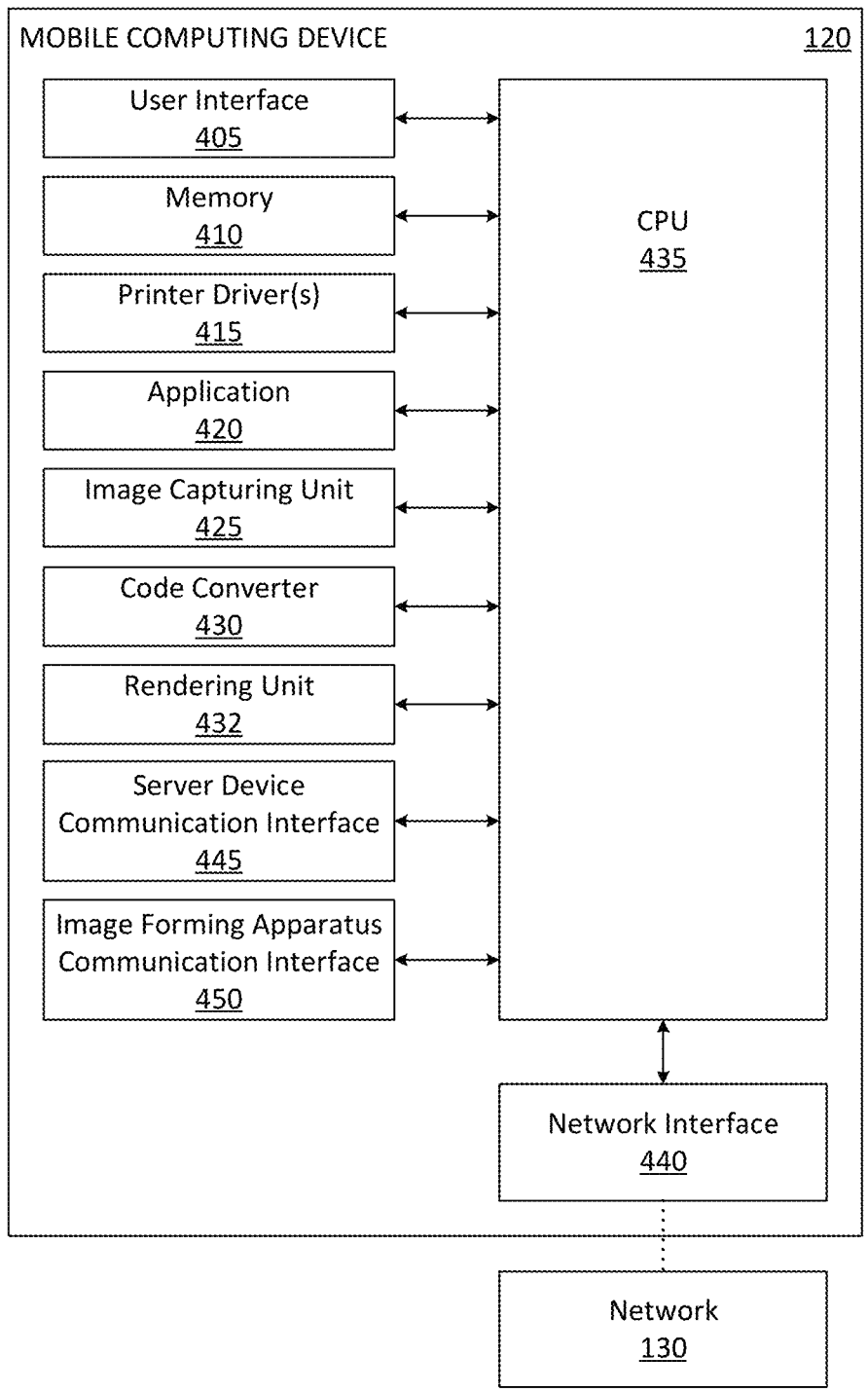
FIG. 4 illustrates a mobile computing device in accordance with some embodiments of the present invention.

FIG. 4 illustrates a mobile computing device 120 in accordance with some embodiments of the present invention. The mobile computing device 120 includes a user interface 405, memory 410, one or more printer drivers 415, an application 420, an image capturing unit 425, a code converter 430, a CPU 435 and a network interface 440 configured to be coupled to a network 130. In some embodiments, the mobile computing device 120 may be configured to perform the same or similar operations as those of the client computing device 105. The mobile computing device 120 may also include a rendering unit 432, a server device communication interface 445 and an image forming apparatus communication interface 450.

The CPU 435 may include one or more processors capable of executing instructions, such as instructions which cause the mobile computing device 120 to perform various operations. The CPU 435 may also incorporate special-purpose processors for special purposes built on application-specific integrated circuits (ASICs) and field-programmable gate arrays (FPGAs).

The user interface 405 may include a touch screen through which information can be displayed and user input can be received. In some embodiments, the mobile computing device 120 may include separate input and/or output devices.

The memory 410 may include both volatile memory and non-volatile memory. Volatile memory may include random-access memory (RAM). Examples of non-volatile memory include read-only memory (ROM), flash memory, electrically erasable programmable read only memory (EEPROM), digital tape, a hard disk drive (HDD), and a solid-state drive (SSD). The memory 410 may include any combination of readable and/or writable volatile memories and/or non-volatile memories, along with other possible memory devices. The memory 410 may store instructions, e.g., program instructions, which are executable by the CPU 435 and/or any other processor(s) for running image forming operations of the mobile computing device 120. The memory 410 may also store data for various programs/applications, as well as data specific to the mobile computing device 120, e.g., for running the operating system (OS).

The application 420 (e.g., Microsoft Word), like application 220, includes document editing hardware, software and/or firmware to enable the user to generate, edit and/or access a document.

The image capturing unit 425 may include an integrated camera.

In some embodiments, the mobile computing device 120 also includes a rendering unit 432. The rendering unit 432 includes hardware, software and/or firmware capable of rendering received documents into printable representation.

Direct to Printer

In some embodiments, the user uses the image capturing unit 415 of the mobile computing device 120 to capture the graphical code image associated with the desired document, e.g., when the client computing device 105 generates the graphical code image. In some embodiments, the user presents the graphical code image displayed on the mobile computing device 120 to the image forming apparatus 125, e.g., by presenting the graphical code image to a scanner of the image forming apparatus 125. In some embodiments, the server device communication interface 445 obtains the document from the server device 110. In some embodiments, the user uses the mobile computing device 120 to review a print preview of the document, and change configuration settings. In some embodiments, the user uses the application 420 to change content in the document. In some embodiments, the image forming apparatus communication interface 450 provides the document as received, amended and/or rendered to the image forming apparatus 125 for printing.

Image Forming Apparatus Presents List

In embodiments where the image forming apparatus 125 displays a list of document descriptors of documents that the user is permitted to access and allows the user to identify a desired document for printing from the list, the user may use the image capturing unit 425 of the mobile computing device 120 to identify a desired document from the list. The server device communication interface 445 provides the graphical code image or the document identifier represented thereby to the server device 110, which retrieves the associated document. The server device communication interface 445 receives the document from the server device 110. The rendering unit 432 renders the document into a printable representation. In some embodiments, the user uses the mobile computing device 120 to review a print preview of the document, and change configuration settings. In some embodiments, the user uses the application 420 to change content in the document. In some embodiments, the image forming apparatus communication interface 450 provides the document as received, amended and/or rendered to the image forming apparatus 125 for printing.

Mobile Computing Device Presents List

In some embodiments (e.g., embodiments where the graphical code image is not generated by the client computing device), the mobile computing device 125 obtains document descriptors of documents that the user is permitted to access (e.g., print jobs located in the queue that are associated with the user), presents the list, and allows the user to identify a desired document for printing from the list. In response to selection of a desired document, the mobile computing device 120 displays the graphical code image. In some embodiments, the user presents the graphical code image being displayed on the mobile computing device 120 to the image forming apparatus 125, e.g., by presenting the graphical code image to a scanner of the image forming apparatus 125. In some embodiments, the server device communication interface 445 obtains the document from the server device 110. In some embodiments, the user uses the mobile computing device 120 to review a print preview of the document, and change configuration settings. In some embodiments, the user uses the application 420 to change content in the document. In some embodiments, the image forming apparatus communication interface 450 provides the document as received, amended and/or rendered to the image forming apparatus 125 for printing.

In some embodiments, the code converter 430 may be hardware, software and/or firmware capable of managing the conversion of graphical code images and document identifiers. The code converter 430 may read, decode, parse, or otherwise interpret the graphical code image to extract the document identifier therefrom. In some embodiments, upon receiving a graphical code image associated with a desired document from a scanned graphical code image captured from the image forming apparatus 125, the code converter 430 may convert the selected graphical code image to the document identifier. In some embodiments, the image capturing unit 425 captures the graphical code image.

In some embodiments, the code converter 430 is on the server device 110, and the image forming apparatus 125 and the mobile computing system 120 may communicate the graphical code image with the server device 110.

Figure 6:
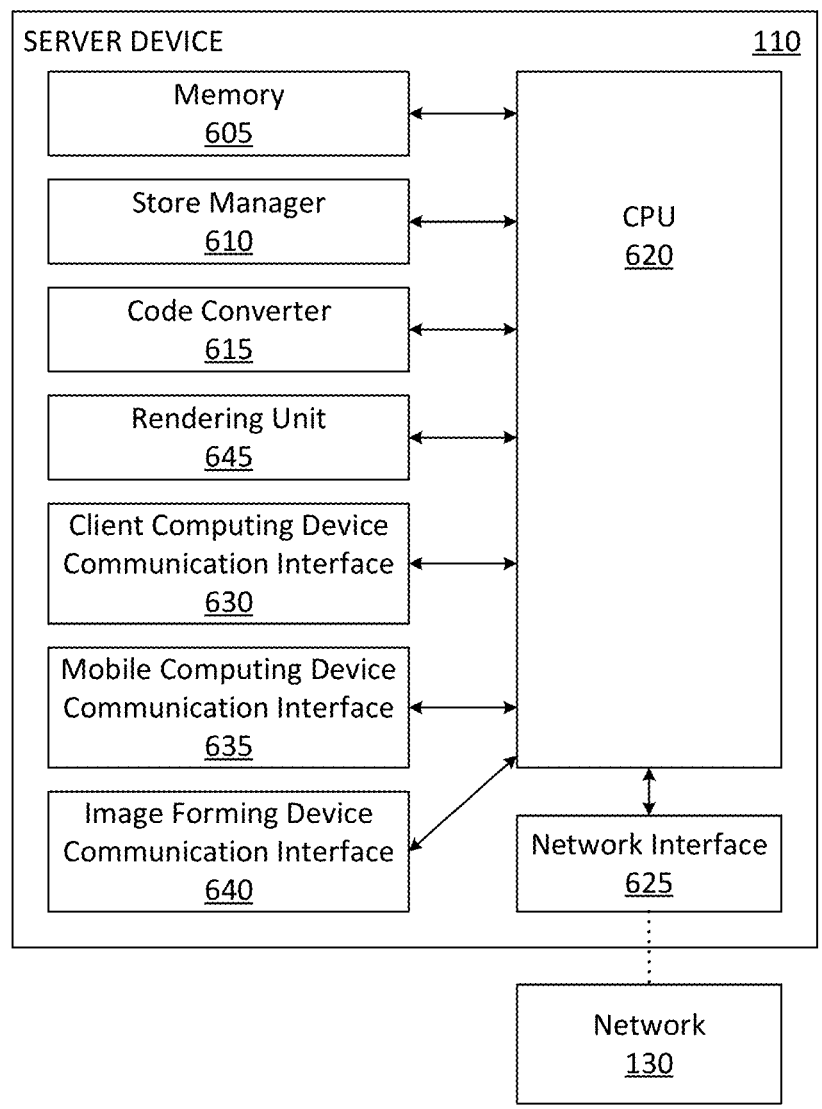
FIG. 6 illustrates a server device in accordance with some embodiments of the present invention.

FIG. 6 illustrates a server device 110 in accordance with an embodiment of the present invention. The server device 110 includes memory 605, a storage manager 610, a code converter 615, a CPU 620, and a network interface 625 configured to communicate with a network 130. The server device 110 may also include a client computing device communication interface 630, a mobile computing communication interface 635 and an image forming apparatus communication interface 640. In some embodiments, the code converter 615 is part of the storage manager 610.

The CPU 620 may include one or more processors capable of executing instructions, such as instructions which cause the server device 110 to perform various operations. The CPU 620 may also incorporate special-purpose processors for special purposes built on application-specific integrated circuits (ASICs) and field-programmable gate arrays (FPGAs).

The memory 605 may include both volatile memory and non-volatile memory. Volatile memory may include random-access memory (RAM). Examples of non-volatile memory include read-only memory (ROM), flash memory, electrically erasable programmable read only memory (EEPROM), digital tape, a hard disk drive (HDD), and a solid-state drive (SSD). The memory 605 may include any combination of readable and/or writable volatile memories and/or non-volatile memories, along with other possible memory devices. The memory 605 may store instructions, e.g., program instructions, which are executable by the CPU 620 and/or any other processor(s) for running image forming operations of the server device 110. The memory 605 may also store data for various programs/applications, as well as data specific to the server device 110, e.g., for running the operating system (OS).

The storage manager 610 includes hardware, software and/or firmware configured to manage the storage of documents and document identifiers and/or graphical code images in local storage and/or in the data storage 115, e.g., as persistent storage or a print queue.

Direct to Printer

In some embodiments, the storage manager 610 receives documents and graphical code images and/or document identifiers for storage in data storage 115 and/or printing. The image forming apparatus communication interface 640 awaits a selected document from the image forming apparatus 125. Upon receipt of a particular graphical code image or the document identifier represented thereby, the storage manager 610 uses the particular graphical code image or the document identifier represented thereby to identify and retrieve the desired document associated therewith. In some embodiments, the server device 110 includes a rendering unit 645 that includes hardware, software and/or firmware capable of converting the document into a printable representation. The image forming device communication interface 640 provides the document, possibly in the printable representation, to the image forming apparatus 125 for printing.

Image Forming Apparatus Presents List

In some embodiments, the image forming device communication interface 640 may receive a user identifier and a set request from the image forming apparatus 125 (e.g., in response to the user logging into the image forming apparatus 125). The storage manager 610 may determine the set of documents and associated document descriptors of the documents that the user is permitted to access (e.g., print jobs located in the queue that are associated with the user). The image forming device communication interface 640 provides the set of document descriptors to the image forming apparatus 125, which displays the set as a list to the user. In some embodiments, the user uses his or her mobile computing device 120 to capture the graphical code image associated with the desired document (e.g., using a camera on the mobile computing device 120). The mobile computing device communication interface 635 may receive the graphical code image selection from the mobile computing device 120. The storage manager 610 may retrieve the document and instruct the mobile computing device communication interface 640 to provide the document to the mobile computing device 120.

In some embodiments, the user reviews a print preview of the document, and if desired changes configuration settings. In some embodiments, the server device 110 includes the rendering unit 645 for rendering the document. The change of configuration settings may be provided to the mobile computing device communication interface 635. The rendering unit 645 re-renders the document. The mobile computing device communication interface 645 re-sends the re-rendered document. In some embodiments, the user on the mobile computing device 120 updates the document itself. The updated document is provided to the mobile computing device communication interface 635. The storage manager 610 stores the updated document.

In some embodiments, the mobile computing device 120 instructs the printing of the document. In some embodiments, the mobile computing device 120 provides the instruction to the mobile computing device communication interface 635. The storage manager 610 instructs the image forming device communication interface 640 to provide the document to the image forming apparatus 125 for printing. In other embodiments, the mobile computing device 120 provides the document directly to the image forming apparatus 120 for printing.

Mobile Computing Device Presents List

In some embodiments, the mobile computing device communication interface 635 receives a user identifier and a set request from the mobile computing device 120 (e.g., in response to the user opening an app on his or her mobile computing device 120). The storage manager 610 may determine the set of documents and associated document descriptors of the documents that the user is permitted to access (e.g., print jobs located in the queue that are associated with the user). From the set displayed on the mobile computing device 125, the user may select a desired document for printing and may provide the graphical code image associated with the desired document to the image forming apparatus 125. The image forming apparatus 125 provides the graphical code image or the document identifier represented thereby to the image forming apparatus communication interface 640. The storage manager 610 uses the graphical code image or the document identifier represented thereby to retrieve the desired document. In some embodiments, the server device 110 includes the rendering unit 645 for converting the document into a printable representation. The image forming apparatus communication interface 640 provides the document the image forming apparatus 125. In some embodiments, the image forming apparatus 125 converts the document into a printable representation. The image forming apparatus 125 prints the document.

In some embodiments, the code converter 615 is capable of generating document identifiers. In some embodiments, the code converter 615 is capable of generating graphical code images from document identifiers (whether the document identifiers are generated by the client computing device 105 or locally by the code converter 615). In some embodiments, the code converter 615 is capable of converting document identifiers to and/or from graphical code images. For example, if the server device 110 stores only the document identifiers in association with the documents and transfers the information to the mobile computing device 120 or the image forming apparatus 125 in the form of graphical code images, the code converter 615 may convert the document identifiers to graphical code images. If the server device 110 receives a graphical code image selection from the mobile computing device 120 or the image forming apparatus 125, then the code converter 615 may convert the document graphical code image to a document identifier.

Figure 7:
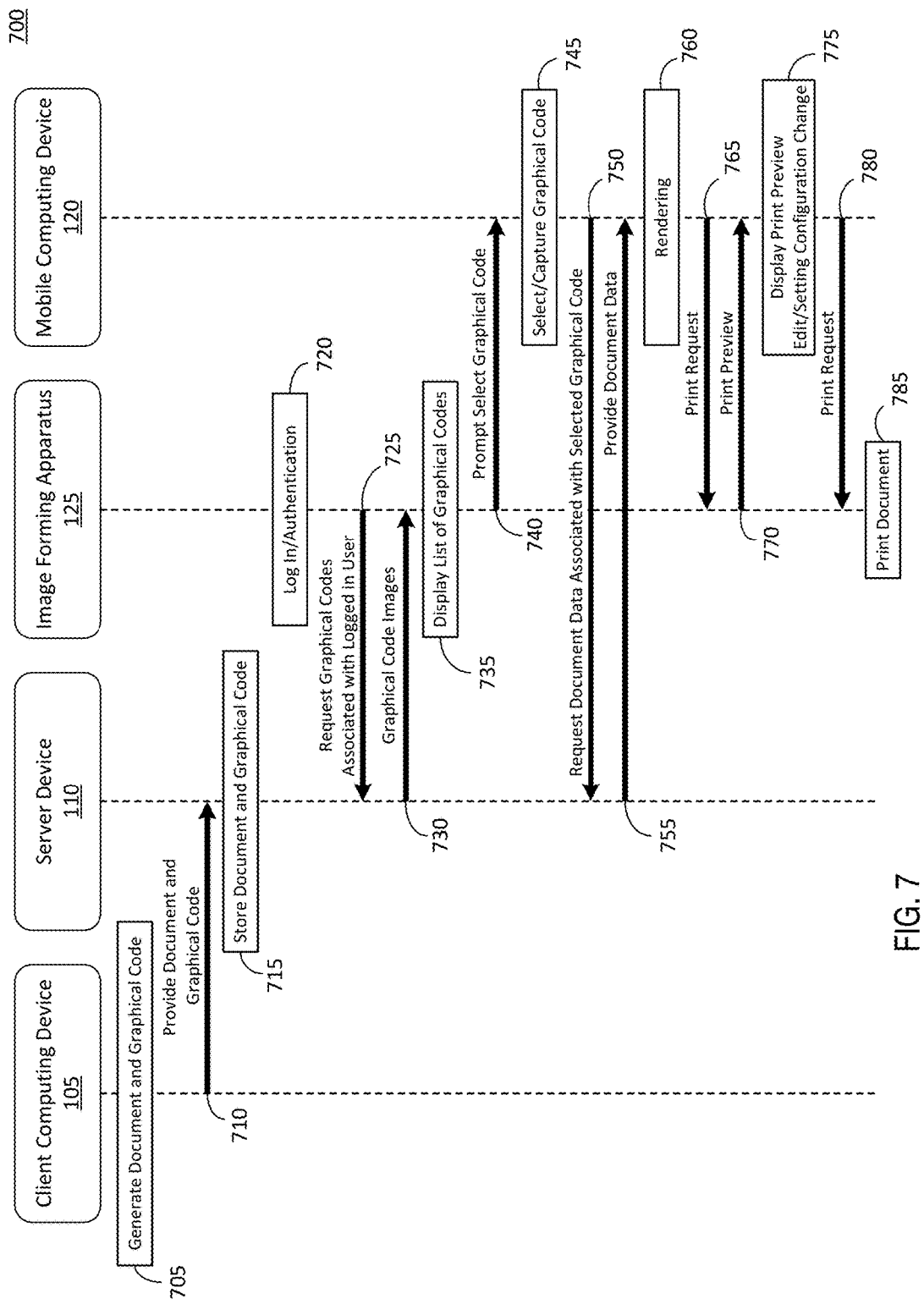
FIG. 7 is a flow diagram illustrating a method of printing a network document, in accordance with a first embodiment of the present invention.

FIG. 7 is a flow diagram illustrating a method 700 of printing a network document, in accordance with a first embodiment of the present invention. Although the method 700 is shown as presenting a list of graphical code images to the user, it will be appreciated that the available documents may be presented as document descriptors, which may include graphical code images. Further, although the method 700 is shown as storing graphical code images with the documents, it will be appreciated that the server device 110 may store, receive and/or transmit the document identifiers.

The method 700 begins in step 705 with a user generating a document on a client computing device 105 and instructing the server device 110 to store the document, e.g., in data storage 115. The client computing device 105 generates a graphical code image, and associates the graphical code image with the document. The client computing device 105 instructs the server device 110 to store the graphical code image in association with the document. In some embodiments, the client computing device 105 generates only the document identifier and does not generate the graphical code image. In some embodiments, another component, e.g., the server device 110, generates the graphical code image.

In step 710, the client computing device 105 sends the document to the server device 110 for storage, e.g., in the data storage 115. In the embodiment where the client computing device 105 generated the graphical code image, the client computing device 105 sends the graphical code image to the server device 110 for storage, e.g., in the data storage 115, in association with the document.

In step 715, the server device 110 stores the document, e.g., in the data storage 115 in association with the user. Whether the client computing device 105 or the server device 110 generated the graphical code image, the server device 110 stores the graphical code image in association with the document.

In step 720, a user logs into the image forming apparatus 125, e.g., using the authentication process 355 to authenticate himself or herself. The image forming apparatus 125 may perform authentication by requesting a username and password, scanning of a user identification card, etc. In some embodiments, there may be no authentication.

In step 725, the image forming apparatus 125 sends a request to the server device 110 for graphical code images associated with documents that the user is authorized to access, that are available to the image forming apparatus 125, and that are authorized to be printed. In some embodiments, the request includes user-identifying information so that the server device 110 can determine which graphical code images the user and/or image forming apparatus 125 is authorized to access, receive and/or print.

In step 730, the server device 110 determines which graphical code images the user and/or image forming apparatus 125 is authorized to access, receive and/or print, and sends the graphical code images to the image forming apparatus 125.

In step 735, the image forming apparatus 125 displays a list of graphical code images. The list of graphical code images is displayed on, for example, the operation panel 305. In some embodiments, the list of the graphical code images and/or a selected graphical code image may be printed instead of displayed. One skilled in the art will recognized that the graphical code images need not be displayed as a list format. Further, different document descriptors (instead of or in addition to graphical code images) may be presented to support easier user recognition of the documents.

In step 740, the image forming apparatus 125 enables selection of one or more of the graphical code images displayed thereon.

In step 745, the user selects and captures the graphical code image of a desired document. In some embodiments, the user may use his or her mobile computing device 120 to capture a snapshot of the graphical code image. In some embodiments, the user may capture two or more graphical code images at once.

In step 750, the mobile computing device 120 requests the document associated with the selected graphical code image to be printed. In some embodiments, the mobile computing device 120 requests the document by sending the selected graphical code image to the server device 110. In some embodiments, the mobile computing device 120 may first decode the document identifier from the graphical image code, and may request the document by sending the document identifier contained within the graphical code image to the server device 110.

In step 755, the server device 110 obtains the document identifier and retrieves the document associated therewith. In some embodiments, the server device 110 receives and decodes the graphical code image into the document identifier. In some embodiments, the server device 110 receives the document identifier directly. The server device 110 sends the document to the mobile computing device 120.

In step 760, the mobile computing device 120 renders the requested document into a printable representation.

In step 765, the user, via the mobile computing device 120, issues a print request. In some embodiments, the mobile computing device 120 sends the selected document with the print request to the image forming apparatus 125 over a wireless channel. In other embodiments, the mobile computing device 120 sends the print request to the server device 110, which provides the document to the image forming apparatus 125.

In step 770, the image forming apparatus 125 generates and sends a print preview to the mobile computing device 120, in accordance with the presented embodiment. In some embodiments, the print preview may be sent to the mobile computing device over the wireless channel. In other embodiments, the print preview may be sent to the server device 110, which forwards the print preview to the mobile computing device 120. In other embodiments, the print preview may be generated by the mobile computing device 120 itself to avoid the data transfer.

In step 775, the user, via the mobile computing device 120, reviews the print preview and may edit configuration settings. If the user edits the configuration settings, the method 700 may return to step 765 to request another print preview.

In step 780, assuming that the document is ready for printing, the user, via the mobile computing device 120, submits the final print request. In some embodiments, the mobile computing device 120 sends the print request to the image forming apparatus 125 over a wireless channel. The mobile computing device 120 provides the document to the image forming apparatus 125 for printing. In some embodiments, the print request goes to the server device 110, which forwards the print request and the document to the image forming apparatus 125.

In step 785, the image forming apparatus 785 prints the document.

Figure 8:
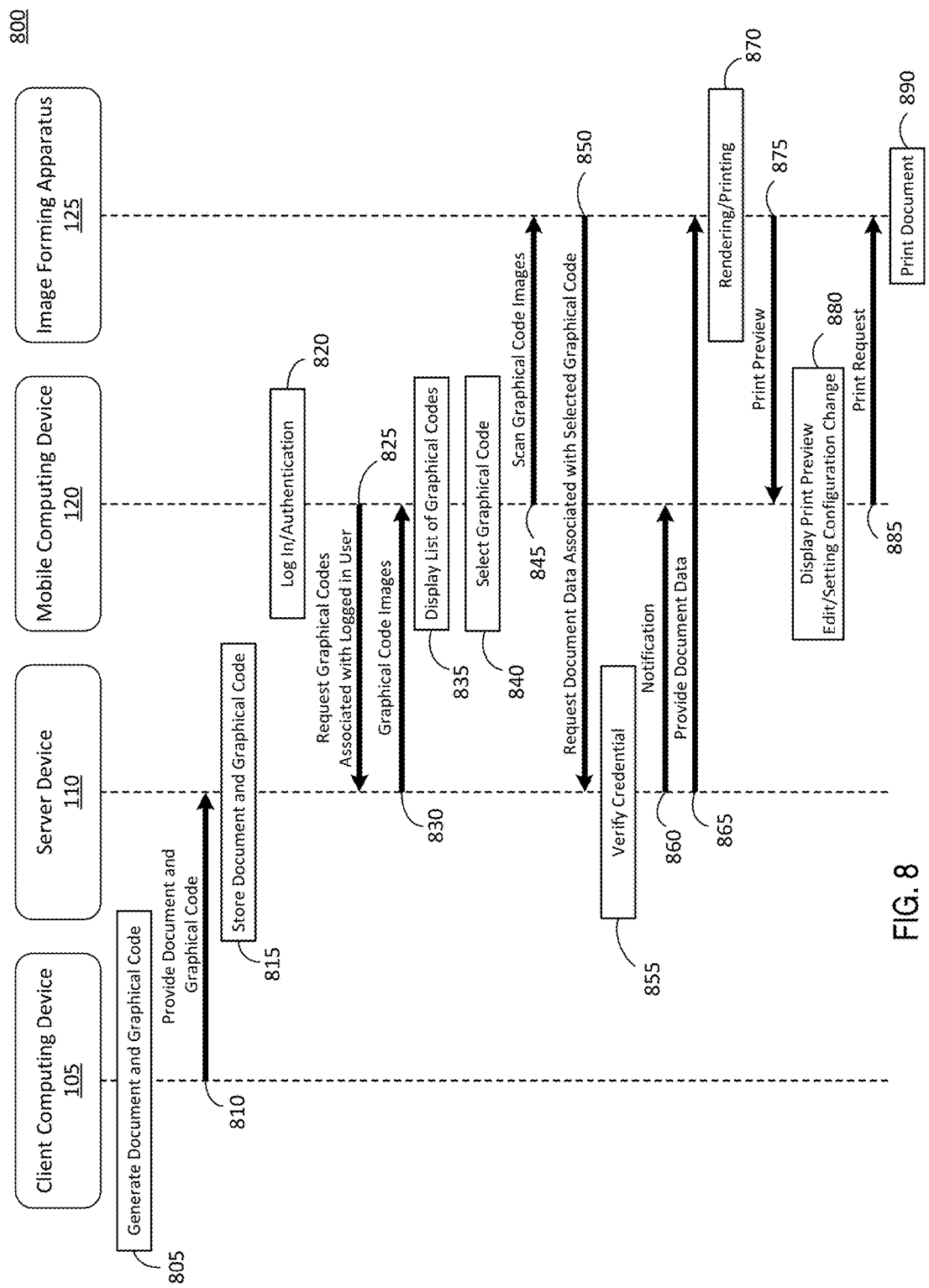
FIG. 8 is a flow diagram illustrating a method of printing a network document, in accordance with a second embodiment of the present invention.

FIG. 8 is a flow diagram illustrating a method 800 of printing a network document, in accordance with a second embodiment of the present invention. Although the method 800 is shown as presenting a list of graphical code images to the user, it will be appreciated that the available documents may be presented as document descriptors, which may include graphical code images. Further, although the method 800 is shown as storing graphical code images with the documents, it will be appreciated that the server device 110 may store, receive and/or transmit the document identifiers.

The method 800 begins in step 805 with a user generating a document on a client computing device 105 and instructing the server device 110 to store the document, e.g., in data storage 115. The client computing device 105 generates a graphical code image, and associates the graphical code image with the document. The client computing device 105 instructs the server device 110 to store the graphical code image in association with the document. In some embodiments, the client computing device 105 generates only the document identifier and does not generate the graphical code image. In some embodiments, the server device 110 generates the graphical code image.

In step 810, the client computing device 105 sends the document to the server device 110 for storage, e.g., in the data storage 115. In the embodiment where the client computing device 105 generated the graphical code image, the client computing device 105 sends the graphical code image to the server device 110 for storage, e.g., in the data storage 115, in association with the document.

In step 815, the server device 110 stores the document, e.g., in the data storage 115 in association with the user. Whether the client computing device 105 or the server device 110 generated the graphical code image, the server device 110 stores the graphical code image in association with the document.

In step 820, a user logs into a mobile computing device 120 and authenticates himself or herself. Authentication can be performed by entering a username and password, scanning a user identification card, etc. In some embodiments, there may be no log-in or authentication.

In step 825, from the mobile computing device 120, the user sends a request to the server device 110 for graphical code images associated with documents that the user is authorized to access, that are available to the image forming apparatus 125, and that are authorized to be printed. In some embodiments, this may be done via an application on the mobile computing device 120 (e.g., an application commonly referred to as an "app") associated with the printing process. In some embodiments, the request includes user-identifying information so that the server device 110 can determine which graphical code images the user and/or image forming apparatus 125 is authorized to access, receive and/or print.

In step 830, the server device 110 determines which graphical code images the user is authorized to receive, and sends the graphical code images to the image forming apparatus 125.

In step 835, the mobile computing device 120 displays a list of graphical code images, e.g. on user interface 405. The list may include documents which the user can access, the documents the user is permitted to print out, or all documents which the user stored. In some embodiments, the list of the graphical code images and/or a selected graphical code image may be printed instead of displayed. As stated above, the graphical code images need not be presented in a list. Further, different document descriptors (e.g., document title, icon, document number) may be presented (instead or in addition to the graphical code images) to support easier user recognition of the documents.

In step 840, the mobile computing device 120 enables and receives selection of one or more of the graphical code images displayed thereon. In some embodiments, the user may receive selection of two or more graphical code images at once.

In step 845, the image forming apparatus 125 obtains the graphical code image of the document desired to be printed. The user may display the selected graphical code image on the mobile computing device 120 and image forming apparatus 125 may use a graphical code image scanner to scan the graphical code image.

In step 850, the image forming apparatus 125 sends a request to the server device 110 for the document data associated with the graphical code image. In some embodiments, the image forming apparatus 125 requests the document by sending the selected graphical code image to the server device 110. In some embodiments, the image forming apparatus 125 may first decode the document identifier from the graphical image code, and may request the document by sending the document identifier contained within the graphical code image to the server device 110. In some embodiments, the request includes credentials of the image forming apparatus 125.

In step 855, in accordance with some embodiments, the server device 110 verifies the credentials of the image forming apparatus 125.

In step 860, in accordance with some embodiments, the server device 110 sends a notification to the mobile computing device 120 of the request from the image forming apparatus 125.

In step 865, the server device 110 obtains the document identifier and retrieves the document associated therewith. In some embodiments, the server device 110 receives and decodes the graphical code image into the document identifier. In some embodiments, the server device 110 receives the document identifier directly. The server device 110 sends the document to the image forming apparatus 125.

In step 870, the image forming apparatus 125 renders the requested document into a printable representation. In some embodiments, the method 800 goes directly to step 890 for the image forming apparatus 125 to print the document.

In step 875, the image forming apparatus 125 generates and sends a print preview to the mobile computing device 120, in accordance with the presented embodiment. In some embodiments, the image forming apparatus provides the print preview to the mobile computing device 120 over a wireless channel. In other embodiments, the document is sent to the mobile computing device 120, which generates the print preview.

In step 880, the user, via the mobile computing device 120, reviews the print preview and if desired edits configuration settings. If the user edits the configuration settings, the method 800 may return to step 870 to generate another print preview.

In step 885, assuming that the document is ready for printing, the user, via the mobile computing device 120, submits the final print request. In some embodiments, the mobile computing device 120 sends the print request to the image forming apparatus 125 over a wireless channel. In some embodiments, the print request goes to the server device 110, which forwards the print request and the document to the image forming apparatus 125. In some embodiments, user provides the print request directly to the image forming apparatus 125.

In step 890, the image forming apparatus 785 prints the document.

Figure 9:
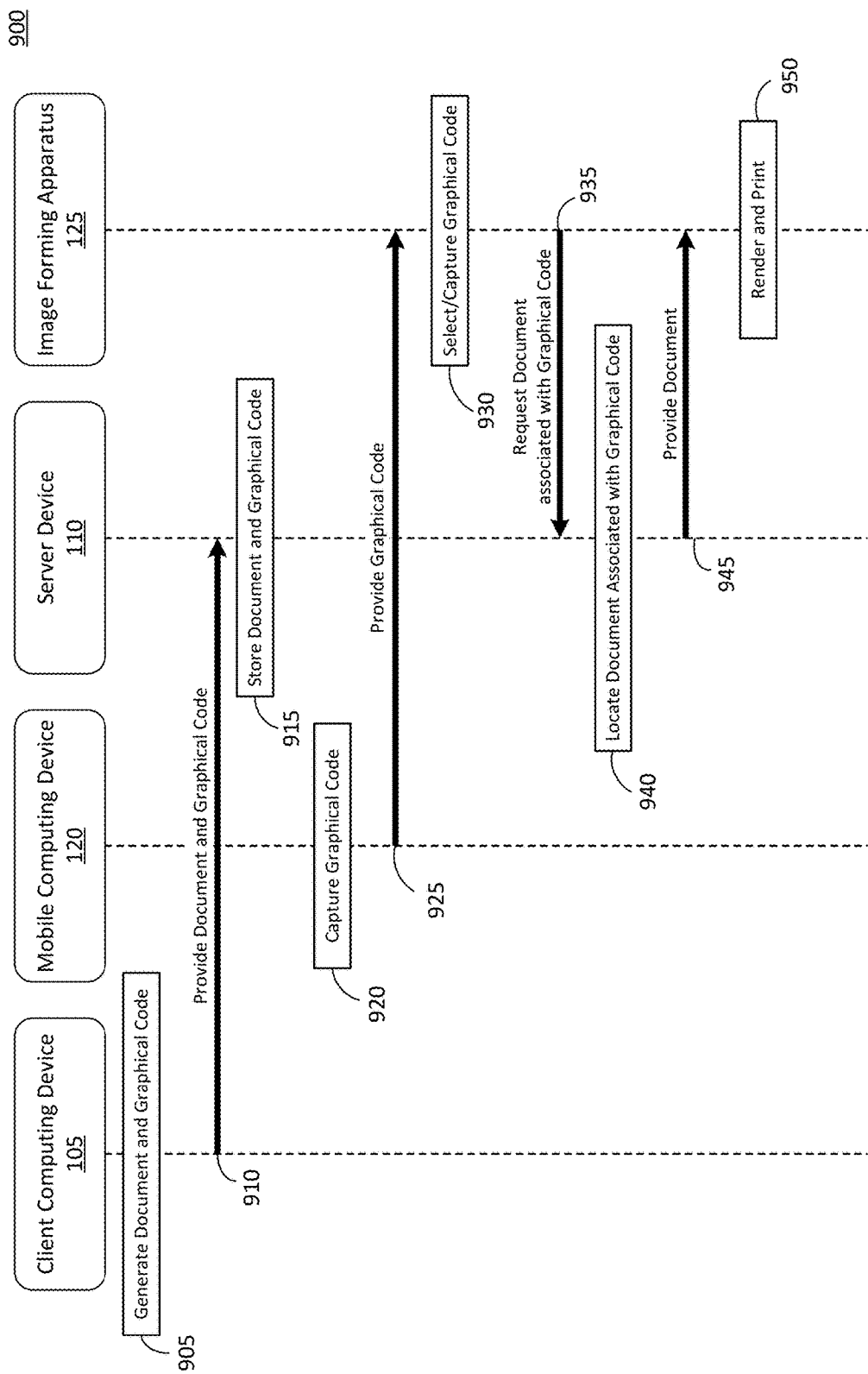
FIG. 9 is a flow diagram illustrating a method of printing a network document, in accordance with a third embodiment of the present invention.

FIG. 9 is a flow diagram illustrating a method 900 of printing a document, in accordance with a third embodiment of the present invention.

Method 900 begins with the client computing device 105 in step 905 generating the document and the graphical code image associated with the document. Although the method 900 is shown as having the client computing device 105 generating the graphical code image, it will be appreciated that another component such as the server device 110 may generate the graphical code image.

In step 910, the client computing device 105 provides the document and the graphical code image to the server device 110.

In step 915, the server device 110 stores the document and the graphical code image, possibly in a data storage 115 and/or in a print queue.

In step 920, the user, via the mobile computing device 120, captures the graphical code image, possibly by using a camera on the mobile computing device 120 to take a picture of the graphical code image displayed on a display unit 205 of the client computing device 105.

In step 925, the mobile computing device 120 provides the graphical code image to the image forming apparatus 125.

In step 930, the image forming apparatus 125 obtains the graphical code image, e.g., by using a scanner of the imaging forming apparatus 125 to scan the graphical code image displayed on the mobile computing device 120.

In step 935, the image forming apparatus 125 sends the graphical code image or the document identifier represented thereby to the server device 110 to request the document associated with the graphical code image from the server device 110.

In step 940, the server device 110 uses the graphical code image or the document identifier represented thereby to locate the document.

In step 945, the server device 110 provides the document to the image forming apparatus 125 for printing.

In step 950, the image forming apparatus 125 converts the document into a printable representation and prints the document.

The foregoing description of the preferred embodiments of the present invention is by way of example only, and other variations and modifications of the above-described embodiments and methods are possible in light of the foregoing teaching.

For example, in some embodiments, a graphical code image may be generated for a group of documents. For example, a graphical code image may be associated with several versions of the same document.

In some embodiments, printer configuration settings may be stored in association with each document. The print configuration settings may include color settings, duplex settings, a number of document pages to print per sheet of paper, staple settings, among other possible configuration settings.

In some embodiments, the server device 110 may store metadata associated with each document such as authorization information used to confirm user authorization to access and/or print the document.

In some embodiments, the server device 110 and/or data storage 115 may be incorporated into the image forming apparatus 125. The image forming apparatus 125 could decode graphical code images, retrieve documents associated therewith, send documents to mobile computing devices 120, and execute print jobs without accessing an external server device 110.

In some embodiments, the document identifier may be a hash code. Generating the hash code may involve inputting data representative of the graphical code image into a hashing function. The hashing function may be a one-way mapping function that maps a particular graphical code image to a unique combination of alphanumeric characters. The server device 110 may provide the graphical code image (or a portion of data extracted from the graphical code image) to the hashing function, and then compare the output of the hashing function to stored hashes.

In some embodiments, documents and/or document identifiers may be encrypted. A document and/or document identifier may be encrypted individually for a particular user. The particular user may provide authentication credentials, which may be embedded within a graphical code image. The authentication credentials may be used to decrypt the document and/or document identifier.

In some embodiments, a document may be set to expire at a certain date, time and/or event. Upon expiration, the server device 110 may be configured to delete the document from the data storage 115.

In some embodiments, the mobile computing device 120 and the image forming apparatus 125 may be connected to each other via Bluetooth or Wi-Fi Direct. This may prevent mobile computing device 120 from connecting to the same network 130 as that of the image forming apparatus 125 to increase security.

In some embodiments, the graphical code image selected by the user may be sent to the mobile computing device 120 via e-mail, SMS, or other communication process instead of via the camera.

In some embodiments, other document identifiers may be presented to the user for document selection. Upon selection of a document identifier, the graphical code image may then be presented for capture.

In some embodiments, the present invention provides a method comprising using a scanner to capture a particular graphical code image by an image forming apparatus; generating a document request in response to capturing the particular graphical code image, the document request containing a particular document identifier of a particular document; transmitting the document request to a server device, the server device configured to manage storage of documents and associated document identifiers, and configured to identify the particular document based on the particular document identifier; receiving the particular document from the server device in response to the document request; and printing a printable representation of the particular document. The particular document identifier in the document request may be the particular graphical code image. The method may further comprise decoding the particular graphical code image into the particular document identifier. The receiving the particular document from the server device may include receiving the printable representation of the particular document. Alternatively, the method may further comprise rendering the particular document into the printable representation.

Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A printing system comprising:
a server device including:
one or more processors; and
memory storing instructions that, when executed by the one or more processors, cause the server device to perform:
managing storage of documents and associated document identifiers, each of the associated document identifiers associated with a respective graphical code image, a particular set of one or more of the documents and one or more associated document identifiers being associated with a user identifier of a particular user, the particular set of one or more of the documents and one or more document identifiers associated with the particular set of one or more of the documents being stored in response to receiving a storage request from a work computing device, the work computing device being distinct from the server device;
receiving from an image forming apparatus a set request containing the user identifier of the particular user;
identifying the particular set of one or more associated document identifiers based on the user identifier of the particular user;
providing the particular set of one or more associated document identifiers to the image forming apparatus in response to receiving the set request, the particular set of one or more associated document identifiers capable of being displayed by the image forming apparatus;
receiving a document selection of a particular document of the particular set of one or more of the documents;
providing the respective graphical code image associated with the particular document of the particular set of one or more of the documents to the image forming apparatus;
receiving a document request from a mobile computing device of the particular user, the document request containing information identifying the particular document of the particular set of one or more of the documents, the mobile computing device receiving the respective graphical code image identifying the particular document of the particular set of one or more of the documents by scanning the respective graphical code image at the image forming apparatus; and
providing the particular document to the image forming apparatus in response to the document request, thereby facilitating printing of the particular document by the image forming apparatus.

2. The printing system of claim 1, wherein the server device further includes a code converter for converting between the respective graphical code image and the particular document.

3. The printing system of claim 1, wherein the instructions further cause the server device to provide a set of one or more document descriptors to the image forming apparatus in response to receiving the set request, each document descriptor containing information to support the particular user in recognizing an associated document.

4. The printing system of claim 1, wherein:
the image forming apparatus includes:
a first server device communication interface configured to send the set request to the server device, the set request including the user identifier of the particular user; and
an operation panel configured to present the particular set of one or more associated document identifiers, and configured to enable the particular user to identify the particular document; and
the mobile computing device includes:
a camera configured to capture a snapshot of the respective graphical code image associated with the particular document from the image forming apparatus;
a second server device communication interface configured to send the document request for the particular document to the server device, the document request including the information identifying the particular document; and
an image forming unit configured to print a printable representation of the particular document.

5. The printing system of claim 4, wherein the instructions further cause the server device to send the particular document to the mobile computing device in response to the document request, and the mobile computing device further includes a rendering unit configured to render the particular document into the printable representation.

6. The printing system of claim 5, wherein the mobile computing device further includes an image forming apparatus communication interface configured to send the printable representation to the image forming apparatus.

7. The printing system of claim 6, wherein the mobile computing device further includes a user interface configured to display a print preview of the particular document.

8. The printing system of claim 7, wherein the user interface is further configured to receive an instruction to edit the printable representation, and configured to change a configuration setting and generate an updated print preview in response to the instruction.

9. The printing system of claim 1, wherein the server device further includes a code generator configured to generate the respective graphical code images.

10. A method comprising:
managing storage of documents and associated document identifiers, each of the associated document identifiers associated with a respective graphical code image, a particular set of one or more of the documents and one or more associated document identifiers being associated with a user identifier of a particular user, the particular set of one or more of the documents and one or more document identifiers associated with the particular set of one or more of the documents being stored in response to receiving a storage request from a work computing device, the work computing device being distinct from a server device;
receiving from an image forming apparatus a set request containing the user identifier of the particular user;
identifying the particular set of one or more associated document identifiers based on the user identifier of the particular user;
providing the particular set of one or more associated document identifiers to the image forming apparatus in response to receiving the set request, the particular set of one or more associated document identifiers capable of being displayed by the image forming apparatus;
receiving a document selection of a particular document of the particular set of one or more of the documents;
providing the respective graphical code image associated with the particular document of the particular set of one or more of the documents to the image forming apparatus;
receiving a document request from a mobile computing device of the particular user, the document request containing information identifying the particular document of the particular set of one or more of the documents, the mobile computing device receiving the respective graphical code image identifying the particular document of the particular set of one or more of the documents by scanning the respective graphical code image at the image forming apparatus; and
providing the particular document to the image forming apparatus in response to the document request, thereby facilitating printing of the particular document by the image forming apparatus.

11. The method of claim 10, further comprising converting between the respective graphical code image and the particular document.

12. The method of claim 10, further comprising providing a set of one or more document descriptors to the image forming apparatus in response to receiving the set request, each document descriptor containing information to support the particular user in recognizing an associated document.

13. The method of claim 10, further comprising rendering the particular document into a printable representation.

14. The method of claim 13, further comprising sending the printable representation to the image forming apparatus.

15. The method of claim 14, further comprising receiving an instruction to edit the printable representation and, in response to the instruction, changing a configuration setting and generating a print preview of the particular document.

16. An image forming apparatus, comprising:
one or more processors; and
memory storing instructions that, when executed by the one or more processors, cause the image forming apparatus to:
authenticate a particular user;
provide a set request to a server device, the server device being configured to manage storage of documents and associated document identifiers, each of the associated document identifiers associated with a respective graphical code image, a particular set of one or more of the documents and one or more associated document identifiers being associated with a user identifier of the particular user, the set request including the user identifier of the particular user, the particular set of one or more of the documents and one or more document identifiers associated with the particular set of one or more of the documents being stored in response to receiving a storage request from a work computing device, the work computing device being distinct from the server device;
receive the particular set of one or more associated document identifiers from the server device in response to the set request;
display the particular set of one or more associated document identifiers;
enable identification of a selected document identifier associated with a particular document for printing;
receive the respective graphical code image for the particular document from the server device;
display the respective graphical code image associated with the selected document identifier in response to the identification of the selected document identifier; and
print a particular printable representation of the particular document associated with the selected document identifier, the printing being facilitated by a document request provided by a mobile computing device to the server device, the document request containing information identifying the particular document, the mobile computing device receiving the respective graphical code image identifying the particular document of the particular set of one or more of the documents by scanning the respective graphical code image at the image forming apparatus.

17. The image forming apparatus of claim 16, wherein the selected document identifier is the respective graphical code image.

18. The image forming apparatus of claim 16, further comprising a code converter for converting between the selected document identifier and the respective graphical code image.

19. The image forming apparatus of claim 16, wherein the instructions further cause the image forming apparatus to render the particular document into a first printable representation.

20. The image forming apparatus of claim 19, wherein the first printable representation is the particular printable representation.

21. The image forming apparatus of claim 19, wherein the instructions further cause the image forming apparatus to provide the first printable representation of the particular document to the mobile computing device.

22. The image forming apparatus of claim 21, wherein the instructions further cause the image forming apparatus to receive a request to edit a print configuration setting, and to re-render the particular document into the particular printable representation.

23. The image forming apparatus of claim 21, wherein the instructions further cause the image forming apparatus to receive a print request from the mobile computing device.

* * * * *